United States Patent
Snis

(10) Patent No.: US 12,241,735 B2
(45) Date of Patent: Mar. 4, 2025

(54) METHOD FOR ESTIMATING A POWDER LAYER THICKNESS

(71) Applicant: Arcam AB, Mölnlycke (SE)

(72) Inventor: Anders Snis, Uddevalla (SE)

(73) Assignee: Arcam AB, Mölnlycke (SE)

( * ) Notice: Subject to any disclaimer, the term of this patent is extended or adjusted under 35 U.S.C. 154(b) by 883 days.

(21) Appl. No.: 17/416,232

(22) PCT Filed: Mar. 4, 2019

(86) PCT No.: PCT/EP2019/055303
§ 371 (c)(1),
(2) Date: Jun. 18, 2021

(87) PCT Pub. No.: WO2020/126111
PCT Pub. Date: Jun. 25, 2020

(65) Prior Publication Data
US 2022/0042797 A1     Feb. 10, 2022

Related U.S. Application Data

(60) Provisional application No. 62/782,900, filed on Dec. 20, 2018.

(51) Int. Cl.
*G01B 21/00*     (2006.01)
*B22F 10/28*     (2021.01)
(Continued)

(52) U.S. Cl.
CPC ............ *G01B 21/085* (2013.01); *B22F 10/28* (2021.01); *B22F 12/90* (2021.01); *B29C 64/153* (2017.08);
(Continued)

(58) Field of Classification Search
CPC ......... B33Y 10/00; B33Y 50/02; B33Y 30/00; B33Y 50/00; G01B 21/085; B29C 64/153;
(Continued)

(56) References Cited

U.S. PATENT DOCUMENTS 3,016,732 A * 1/1962 Hanysz .................... G01B 7/06
324/451
2015/0174658 A1    6/2015 Ljungblad
(Continued)

FOREIGN PATENT DOCUMENTS

| CN | 107848209 A | * | 3/2018 | ............. B22F 10/00 |
| CN | 107980023 A | * | 5/2018 | ............. B22F 10/00 |

(Continued)

OTHER PUBLICATIONS

U.S. Appl. No. 17/416,232, filed Apr. 24, 2024_JP_4384420_B2_H.pdf,Dec. 16, 2009.*
(Continued)

*Primary Examiner* — Gail Kaplan Verbitsky
(74) *Attorney, Agent, or Firm* — Dinsmore & Shohl LLP

(57) ABSTRACT

Disclosed herein are methods for estimating a powder layer thickness in an additive manufacturing machine when forming a three-dimensional article layer by layer. The method comprises applying a first powder layer and selectively melting the first powder layer and thereafter measuring the temperature of the first powder layer at a plurality of times. The method further comprises providing a mathematical function giving a reference temperature as a function of time based on the measured temperatures of the first powder layer, applying a second powder layer on top of the first powder layer and measuring the temperature of the second powder layer at a predetermined time, and estimating the powder layer thickness of the second powder layer based on
(Continued)

the measured temperature of the second powder layer and the reference temperature calculated by means of the mathematical function for the predetermined time point.

20 Claims, 6 Drawing Sheets

(51) Int. Cl.
*B22F 12/90* (2021.01)
*B29C 64/153* (2017.01)
*B29C 64/393* (2017.01)
*G01B 21/08* (2006.01)
*B22F 10/36* (2021.01)
*B22F 10/368* (2021.01)
*B22F 12/49* (2021.01)
*B22F 12/67* (2021.01)

(52) U.S. Cl.
CPC ............ *B29C 64/393* (2017.08); *B22F 10/36* (2021.01); *B22F 10/368* (2021.01); *B22F 12/49* (2021.01); *B22F 12/67* (2021.01)

(58) Field of Classification Search
CPC ........ B29C 64/393; B22F 12/90; B22F 10/28; B22F 12/67; B22F 12/49; B22F 10/36; B22F 10/368
See application file for complete search history.

(56) References Cited

U.S. PATENT DOCUMENTS

| | | | | |
|---|---|---|---|---|
| 2015/0251249 A1* | 9/2015 | Fager | ...................... | B22F 10/28 419/53 |
| 2017/0297095 A1 | 10/2017 | Zalameda | | |

FOREIGN PATENT DOCUMENTS

| | | | | | |
|---|---|---|---|---|---|
| EP | | 2918395 A1 | * | 9/2015 | ............ B22F 3/1055 |
| EP | | 3232352 A1 | * | 10/2017 | ............ B22F 3/1055 |
| EP | | 3 308 945 A1 | | 4/2018 | |
| FR | | 2984779 A1 | * | 6/2013 | ............. B22F 10/20 |
| JP | | 4384420 B2 | * | 12/2009 | |
| WO | | 2011/008143 A1 | | 1/2011 | |
| WO | WO-2014074947 A2 | | * | 5/2014 | ............. B22F 10/20 |
| WO | WO-2016122474 A1 | | * | 8/2016 | ............. B29C 64/20 |
| WO | WO-2017126073 A1 | | * | 7/2017 | ............. B22F 10/20 |

OTHER PUBLICATIONS

U.S. Appl. No. 17/416,232, filed Apr. 26, 2024_CN_107848209_A_H.pdf,Mar. 27, 2018.*
U.S. Appl. No. 17/416,232, filed Apr. 26, 2024_WO_2014074947_A2_H.pdf,May 15, 2014.*
U.S. Appl. No. 17/416,232, filed Apr. 26, 2024_WO_2016122474_A1_H.pdf,Aug. 4, 2016.*
U.S. Appl. No. 17/416,232, filed May 6, 2024_WO_2017126073_A1_H.pdf,Jul. 27, 2017.*
U.S. Appl. No. 17/416,232, filed May 6, 2024_EP_3232352_A1_H.pdf,Oct. 18, 2017.*
U.S. Appl. No. 17/416,232, filed Oct. 30, 2024_EP_2918395_A1_H.pdfSep. 16, 2015.*
U.S. Appl. No. 17/416,232, filed Oct. 30, 2024_FR_2984779_A1_H.pdf,Jun. 28, 2013.*
U.S. Appl. No. 17/416,232, filed Oct. 30, 2024_JP_4384420_B2_H.pdf,Dec. 16, 2009.*
U.S. Appl. No. 17/416,232, filed Oct. 30, 2024_CN_107980023_A_H.pdf,May 1, 2018.*
International Search Report and Written Opinion for application PCT/EP2019/055303 mail date Jun. 25, 2020 (14 pages).

* cited by examiner

METHOD FOR ESTIMATING A POWDER LAYER THICKNESS

CROSS REFERENCE TO RELATED APPLICATIONS

This specification is a National Phase Entry of International Application No. PCT/EP2019/055303 filed Mar. 4, 2019 and entitled "A METHOD FOR ESTIMATING A POWDER LAYER THICKNESS" which itself claims priority to and the benefit of U.S. Provisional Patent Application No. 62/782,900, filed on Dec. 20, 2018, the contents of which as are hereby incorporated by reference in their entirety.

BACKGROUND

Related Field

The invention relates to a method for estimating a powder layer thickness in an additive manufacturing machine when forming a three-dimensional article layer by layer by successive fusion of selected areas of powder layers, which selected areas correspond to successive layers of the three-dimensional article. In addition, the invention relates to a control unit for controlling an additive manufacturing machine.

Description of Related Art

Powder bed freeform fabrication or additive manufacturing (AM) using electron beam melting (EBM) or laser beam melting is a method for forming a three-dimensional article from a powder. The three-dimensional article is formed layer by layer by successive fusion of selected areas of powder layers, which selected areas correspond to successive layers of the three-dimensional article. A layer of powder, such as metal powder, is deposited on a build area and an electron beam or a laser beam is used to selectively melt the powder layer of the build area. The melted material fuses with underlaying layers and solidifies to form the top layer of the solid three-dimensional article. A further layer of powder is deposited onto the previous layer, and the electron or laser beam is used to selectively melt the further powder layer of the build area. The melted material solidifies and form another solid layer fused onto the previous solid layer. This process is repeated for multiple layers until the desired 3D geometry of the article is achieved.

An apparatus for forming such a three-dimensional article has a build table on which the three-dimensional article is to be formed, a powder distributor device for delivering powder to the build table (build area) for the formation of the powder layers and an electron beam source or a laser beam source for providing the energy beam used for melting the powder. Further, a control unit is used for controlling the energy beam to melt the selected areas of the powder layers.

During manufacturing by an AM machine, for avoiding errors in the produced three-dimensional article, the process parameters of the AM machine related to the energy beam and the thickness of the powder layer to be melted have to be adapted to each other. Since the thickness of the powder layer provided by the powder distributor device can vary somewhat between different positions of one and the same powder layer and between different powder layers, a method for estimating the powder layer thickness is desirable. Such estimated values of the powder layer thickness can then be used for adjusting the energy beam and/or modifying the powder layer.

SUMMARY

An objective of the invention is to provide an improved method for estimating a powder layer thickness in an additive manufacturing machine.

The objective is achieved by a method for estimating a powder layer thickness in an additive manufacturing machine when forming a three-dimensional article layer by layer by successive fusion of selected areas of powder layers, which selected areas correspond to successive layers of the three-dimensional article, wherein the method comprises the steps of applying a first powder layer and selectively melting the first powder layer with an energy beam and thereafter measuring the temperature of the first powder layer at a plurality of time points, and further providing a mathematical function giving a reference temperature as a function of time, which mathematical function is based on the measured temperatures of the first powder layer at the plurality of time points, applying a second powder layer on top of the first powder layer and measuring the temperature of the second powder layer at a predetermined time point, and estimating the powder layer thickness of the second powder layer based on the measured temperature of the second powder layer and the reference temperature calculated by means of the mathematical function for the predetermined time point.

The invention is based on the insight that temperature measurements of a powder layer can be used for providing a reference temperature usable for estimating the thickness of a subsequent powder layer.

The estimated powder layer thickness can then be used as input data when controlling the AM machine. For example, for controlling the powder distributor device and/or the energy beam source of the AM machine.

The invention is exemplified by a method for an AM machine using an electron beam, but the invention can be applied for other types of energy beam, such as a laser beam. Adjustment of an electron beam can be made by controlling deflection, stigmator and/or focus amplifiers and corresponding coils of an electron beam source, whereas adjustment of a laser beam can be made by controlling focus lenses, stigmator lenses and/or deflection mirrors of a laser beam source. For example, process parameters such as beam speed, beam spot size and beam power can be varied according to the estimated thickness of the powder layer.

The powder distributor device can be controlled by adjusting the position and/or velocity of a rake blade relative to the build table, for obtaining the desired layer thickness of the powder applied on the build table.

By the expression "a plurality of" with respect to the "time points" when the temperature of the first powder layer is measured is meant two or more time points. Typically, the number of time points for which the temperature of the first powder layer is measured can be in the interval 2-10. These temperature measurements are performed during a time period of a part of a second up to a few seconds.

The temperature of the first powder layer and the temperature of the second powder layer can be measured in different ways as long as a parameter significant for describing the temperature development can be identified. For example, a thermographic camera or a pyrometer can be used.

The temperature of the first powder layer is measured after melting of the first powder layer and suitably before applying a second powder layer on the first powder layer. The temperature is preferably measured at the plurality of time points in one or more positions of the first powder layer which has been melted.

The temperature of the second powder layer at the predetermined time point is suitably measured after raking of the second powder layer. After raking means here after that the second powder layer has been formed and prepared for a subsequent melting of selected areas of the powder layer. When raking the powder layer, one or more sweeps with a rake blade along the powder bed can be performed to obtain an even power layer. The temperature of the second powder layer can be measured between two such sweeps with the rake blade and/or after all sweeps have been performed.

By measuring the temperature of the second powder layer at the predetermined time point before starting to selectively melt the second powder layer, and preferably before any pre-heating of the second powder layer by means of the energy beam, the temperature of the second powder layer is mainly determined by the temperature of the underlaying powder layers. Thus, the temperature of the second powder layer is a function of the temperature of the first powder layer.

According to one embodiment, the method comprises the step of providing the reference temperature as a theoretical temperature for the first powder layer without the second powder layer arranged on top of the first powder layer.

The mathematical function giving the reference temperature as a function of time can be for example a decreasing exponential function or a decreasing linear function $T1=T1(t)$, where $T1$=temperature of the first powder layer and $t$=time point. Such functions can be written $T1=A*e^{-Bt}$ and $T1=A-B*t$. Since the temperature can be dependent on the position on the powder layer, the function can be written $T1=T1(t, x, y)$, where x and y are cartesian coordinates in a horizontal plane in parallel with the powder layer. Such a function can be used for giving a theoretical value of the temperature of the first powder layer at later time points. The constants A, B included in the function can be calculated from the measured temperatures $T1_{measured}$ of the first powder layer for a plurality of time points. A reference temperature representing a theoretical temperature of the first powder layer without the second powder layer arranged on the top of the first powder layer, can then be used for comparison to the measured temperature $T2_{measured}$ of the second powder layer for estimation of the thickness of the second powder layer.

The time points when $T1_{measured}$ was measured, the time point when the second powder layer was added to the first powder layer and the time point $T2_{measured}$ was measured are preferably known to enable estimation or calculation of the second powder layer thickness.

According to a further embodiment, the method comprises the step of providing the reference temperature as a temperature for the second powder layer, where the reference temperature is a function of the thickness of the second powder layer arranged on top of the first powder layer.

When a second powder layer is applied on the first powder layer, the temperature of the second layer is mainly a function of the temperature of the first powder layer, the thickness of the second powder layer and the time. Initially, the temperature will increase to a local maximum and thereafter decrease in a way similar to the temperature of the first powder layer. Thus, optionally, the mathematical function giving the reference temperature can be expressed as $T2=T2(T1, \Delta Z, t)=T2(T1(t, x, y), \Delta Z, t)$, where $T2$=temperature of the second powder layer, $\Delta Z$=thickness of the second powder layer, $t$=time point and $T1$ is the function described above.

The measured temperature $T2_{measured}$ of the second powder layer can then be used together with the reference temperature at the current time point for estimating the thickness of the second powder layer. For example, $T2_{measured}$ can be compared to $T2$ calculated for a nominal powder layer thickness $\Delta Z$. If the difference $T2_{measured}-T2>0$, the real thickness of the second powder layer is smaller than the nominal thickness, and if $T2_{measured}-T2<0$, the real thickness of the second powder layer is greater than the nominal powder layer thickness. Alternatively, by using the measured temperature $T2_{measured}$ and the mathematical function and/or a table based on the function, the thickness $\Delta Z$ of the second powder layer can be calculated. The calculated thickness can then be compared to the nominal desired thickness of the second powder layer.

According to a further embodiment, the method comprises the step of providing the reference temperature for a plurality of positions in a horizontal plane and measuring the temperature of the second powder layer in corresponding plurality of positions in the horizontal plane for the predetermined time point. Hereby, any variation in layer thickness of the powder layer can be estimated. The measurements can be performed throughout the powder layer and in a way such that the number of measurement positions is limited only by the resolution of the temperature measurement devices.

According to a further embodiment, the method comprises the step of providing the reference temperature for the plurality of positions by one the mathematical function for each position which mathematical functions are different from each other. Hereby, a specific mathematical function can be adapted to each position of the powder layer where the temperature is measured. For example, the constants of the mathematical function used may vary between different positions on the powder layer surface and/or the variables x and y representing the position can be included in the function. Thereby, the correctness of the extrapolation of the temperature as a function of time and position can be improved.

According to a further embodiment, the method comprises the step of dividing the first powder layer into different sub areas and providing the reference temperature for the plurality of positions within each sub area by one the mathematical function for each position which mathematical functions are the same within one and the same sub area and which mathematical functions are different from each other with respect to different sub areas. Hereby, the correctness of the extrapolation of the temperature as a function of time and position can be further improved.

According to a further embodiment, the method comprises the step of calculating an average reference temperature for each sub area based on the reference temperatures for the plurality of positions within each sub area. Hereby, the correctness of the extrapolation of the temperature as a function of time and position can be further improved for a limited area of the powder layer surface.

According to a further embodiment, the method comprises the step of measuring the temperature of the second powder layer at a plurality of predetermined time points and estimating the powder layer thickness of the second powder layer based on the measured temperatures of the second powder layer and the reference temperatures calculated by the mathematical function for the plurality of predetermined time points. Hereby, a more reliable estimation of the powder layer thickness can be obtained.

According to a further embodiment, the method comprises the step of measuring the temperature of the second powder layer at the predetermined time point after the temperature of the second powder layer has passed a local maximum. Hereby, even higher reliability and effective measurements can be performed, since the temperature variation of the second powder layer is smaller after the local maximum and therefore the measurements will be less complicated. When the second powder layer is applied on the previous first powder layer, the temperature of the second powder layer will increase rapidly, but after the temperature has reached the local maximum temperature, the temperature of the second powder layer will decrease relatively slowly. In addition, after the local maximum has been reached the shape of the temperature curve for the second powder layer as a function of time, is similar to the shape of the temperature curve for the first powder layer as a function of time.

According to a further embodiment, the method comprises the step of sensing a position of a movable powder distributor device used for applying the second powder layer, and calculating the predetermined time point for measuring the temperature of the second powder layer based on the sensed powder distributor device position. Hereby, for example the earliest predetermined time point for measuring the temperature of the second powder layer can be obtained, since the powder distributor device must have prepared the powder layer at the positions where the temperature is to be measured, and reached a position where the powder distributor device does not interfere with the temperature measurement devices.

According to a further embodiment, the method comprises the step of calculating the predetermined time point for measuring the temperature of the second powder layer by adding a time period to a time point for which time point the powder distributor device position is known. For example, by knowledge of the start position and the time point when the powder distribution device starts to move, the predetermined time point for measuring the temperature of the second powder layer can be obtained by adding a time period to the start time point. In addition, a camera can be used for receiving information about the position of the powder distributor device as a function of time.

According to another aspect of the invention, a further objective is to provide a control unit for controlling an additive manufacturing machine, by which control unit a powder layer thickness in an additive manufacturing machine can be estimated.

This objective is achieved by a control unit for controlling an additive manufacturing machine, for estimating a powder layer thickness in the additive manufacturing machine when applying a first powder layer and selectively melting the first powder layer with an energy beam and thereafter measuring the temperature of the first powder layer at a plurality of time points, wherein the control unit is configured to provide a mathematical function giving a reference temperature as a function of time, which mathematical function is based on the measured temperatures of the first powder layer at the plurality of time points, and when applying a second powder layer on top of the first powder layer and measuring the temperature of the second powder layer at a predetermined time point, the control unit is configured to estimate the powder layer thickness of the second powder layer based on the measured temperature of the second powder layer and the reference temperature calculated by means of the mathematical function for the predetermined time point.

The estimated powder layer thickness can then be used as input data when controlling the AM machine. For example, for controlling the powder distributor device and/or the energy beam source of the AM machine. Adjustment of an electron beam can be made by controlling deflection, stigmator and/or focus amplifiers and corresponding coils of an electron beam source, whereas adjustment of a laser beam can be made by controlling focus lenses, stigmator lenses and/or deflection mirrors of a laser beam source.

The powder distributor device can be controlled by adjusting the position and/or velocity of a rake blade relative to the build table, for obtaining the desired layer thickness of the powder applied on the build table.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 1:
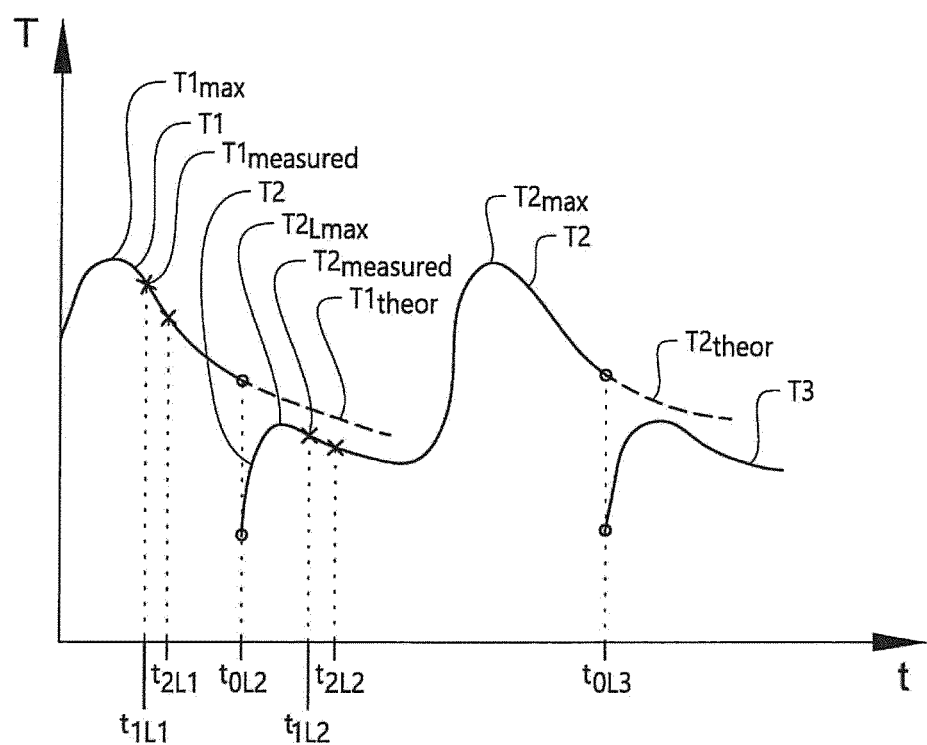
FIG. 1 is an example of a graph showing temperature (T) versus time (t) for a position on an upper surface of a powder bed in an AM machine.

FIG. 1 shows schematically a temperature curve for a specific position on the surface of a powder bed of an additive manufacturing (AM) machine. The temperature T versus time t has been indicated.

To the left in FIG. 1, the temperature T is the temperature T1 of a first powder layer that has been applied. After a maximum temperature $T1_{max}$ which has been reached due to heat transferred from an energy beam to the first powder layer, the temperature T1 of the first powder layer will decrease.

At the time point $t_{0L2}$, there is a discontinuity in the temperature curve. The temperature drop at $t_{0L2}$ is caused by a second powder layer which has been applied onto the first powder layer. From $t_{0L2}$ the temperature T now indicates the temperature T2 of the second powder layer. The dashed line continuing from the T1 curve represents a theoretical temperature curve indicating temperatures $T1_{theor}$ of the first powder layer in case the second powder layer had not been applied. The dashed line curve representing the theoretical temperature curve is obtained from the fitted mathematical function T1=T1(t) described hereinabove.

Since the second powder layer is heated by the first powder layer, the temperature T2 will increase and reach a local maximum $T2_{Lmax}$. Thereafter the temperature T2 will decrease until the second powder layer is heated by the energy beam to a maximum temperature $T2_{max}$. After the maximum temperature $T2_{max}$, the temperature T2 of the second powder layer will decrease.

The temperature curve can then be repeated in a similar way for representing a temperature T3 of a third powder layer applied onto the second powder layer at a time point $t_{0L3}$, and so on for subsequent powder layers.

Figure 2:
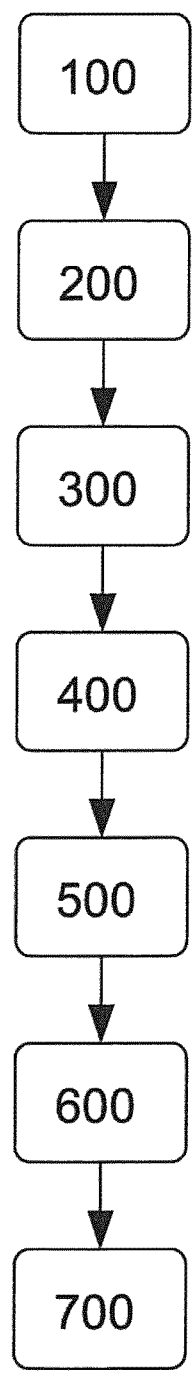
FIG. 2 is a flow chart for illustrating a method for estimating a powder layer thickness.

FIG. 2 shows a flow chart schematically illustrating one example embodiment of a method for estimating a powder layer thickness.

The method described hereinafter is performed in an additive manufacturing (AM) machine. Thus, the method is implemented when forming a three-dimensional article layer by layer by successive fusion of selected areas of powder layers, which selected areas correspond to successive layers of the three-dimensional article. The equipment for melting the powder can be any suitable device for transferring energy by means of an energy beam to the selected areas, such as an electron beam source or laser beam source. The powder layers are suitably applied to a build table by a powder distributor device. The powder distributor device can have a rake displaceable relative to the build table for raking the powder to an even layer of a desired thickness.

The method for estimating a powder layer thickness in an additive manufacturing machine comprises the step 100 of applying a first powder layer and the step 200 of selectively melting the first powder layer with an energy beam, and thereafter the step 300 of measuring the temperature of the first powder layer at a plurality of time points.

With reference to FIG. 1, the temperature measurement of the first powder layer is suitably performed at the plurality of time points $t_{1L1}$, $t_{2L1}$, etc., after the time point for the maximum temperature $T1_{max}$ and before the time point $t_{0L2}$.

The method also comprises the step 400 of providing a mathematical function giving a reference temperature as a function of time, which mathematical function is based on the measured temperatures of the first powder layer at the plurality of time points, the step 500 of applying a second powder layer on top of the first powder layer and the step 600 of measuring the temperature of the second powder layer at a predetermined time point.

With reference to FIG. 1, the mathematical function can provide temperatures $T1_{theor}$ of the theoretical temperature curve for the first powder layer. Alternatively, the mathematical function can provide temperatures T2 of the temperature curve T2 at time points after the time point for the local maximum temperature $T2_{Lmax}$ and before the temperature will increase again due to heat transfer from the energy beam.

The temperature measurement of the second powder layer is suitably performed at one or more time points $t_{1L2}$, $t_{2L2}$, etc., after the time point for the local maximum temperature $T2_{Lmax}$ and before the temperature will increase again due to heat transfer from the energy beam.

Further, the method comprises the step 700 of estimating the powder layer thickness of the second powder layer based on the measured temperature of the second powder layer and the reference temperature calculated by means of the mathematical function for the predetermined time point. Thus, the measured temperature $T2_{measured}$ of the second powder layer is compared with the reference temperature, such as $T1_{theor}$ or T2, for estimating the thickness of the second powder layer. Thus, the time point for the calculated reference temperature and the time point for measuring the temperature $T2_{measured}$ is the same.

The estimated powder layer thickness can then be used as input data when controlling the AM machine. For example, for controlling a powder distributor device and/or an energy beam source of the AM machine.

Figure 3:
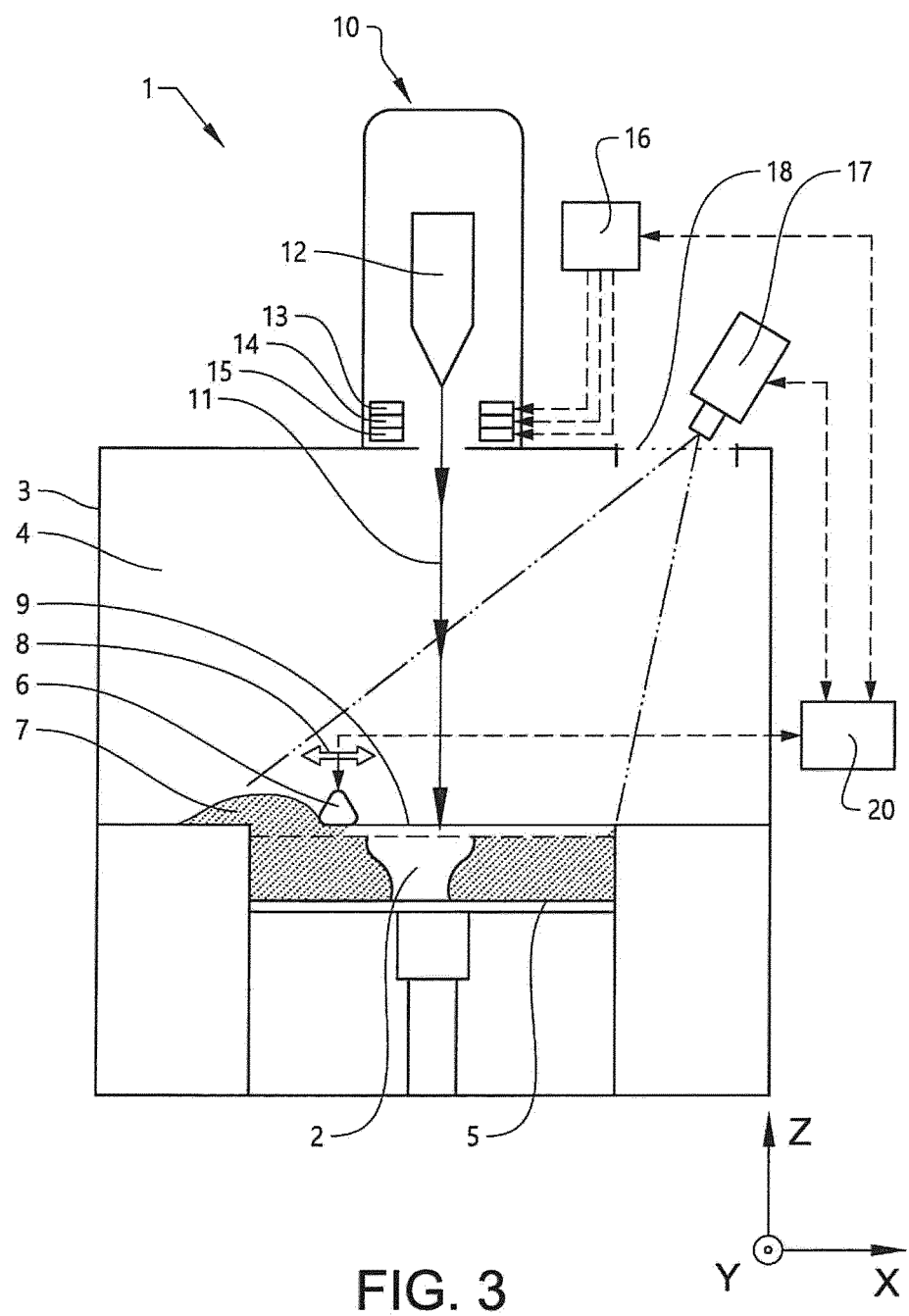
FIG. 3 is a schematic view of an AM machine.

FIG. 3 shows an AM machine 1 for forming a three-dimensional article 2 layer-by-layer by successive fusion of selected areas of a powder layers, which selected areas correspond to successive layers of the three-dimensional article. The machine 1 comprises an outer casing 3 forming a build chamber 4, and a build table 5 arranged inside the casing 3 in the build chamber 4. The build chamber 4 can be arranged for maintaining a vacuum environment by means of a vacuum system, which may comprise a turbomolecular pump, a scroll pump, an ion pump and one or more valves. Such a vacuum system is known to the person skilled in the art and is not further described or illustrated herein.

Further, the machine 1 comprises a powder distributor device 6 and the build table 5 is arranged for receiving powder 7 distributed by the powder distributor device 6. The powder distributor device is here schematically illustrated by a rake blade 6 only. Such a distributor device has however also equipment for displacement of the rake blade relative to the build table 5 for distribution of the powder 7 in an even layer 9 on the build table 5 (on the previous powder layer). The build table 5 has preferably a top surface that is flat and horizontal and faced upwardly in a vertical direction. The rake blade 6 is displaceable in a horizontal direction 8 in parallel with the surface of the build table 5.

The AM machine has suitably means (not shown) for movement of the build table 5 in the vertical direction, such as a servo motor equipped with a gear, adjusting screws, etc. The powder distributor device 6 is arranged to lay down a thin layer 9 of the powder material 7 on the build table 5. During a work cycle the build table 5 will be lowered for maintaining the position of the top surface of the powder bed when adding powder layers to the powder bed.

The AM machine 1 has an energy beam source 10 arranged for creating an energy beam 11. The energy beam 11 is used for melting the selected areas of the powder. The energy beam is scanned over the surface of the current powder layer for melting the selected areas. The selected areas of each layer can be based on a model dividing the article to be manufactured in successive layers or slices. The model may be a computer model generated by a CAD (Computer Aided Design) tool.

In the example embodiment illustrated in FIG. 3, the energy beam source is an electron beam source 10. The electron beam source 10 can be designed in a way well known to the person skilled in the art. The electron beam source 10 may have an electron gun 12 with an emitter electrode which is connected to a high voltage circuit and a current source for accelerating electrons and releasing electrons from the emitter electrode. These electrons form the electron beam 11. The electron beam source 10 has also focus coils 13, stigmator coils 14 and deflection coils 15 for focusing and directing the electron beam 11 on various positions of the powder layer surface. The electron beam source 10 has further focus amplifiers, stigmator amplifiers and deflection amplifiers 16 connected to the focus coils 13, stigmator coils 14 and the deflection coils 15, respectively.

The coils 13, 14, 15 and the amplifiers (shown as one component) 16 are schematically illustrated in FIG. 3.

The AM machine further comprises a temperature sensing device or temperature measurement device 17. This device can be a thermographic camera (also sometimes called "IR camera") which is positioned outside the chamber 4. For example, the thermographic camera 17 can be arranged above the chamber to be directed towards the build area and an upper surface of the powder layer. A window 18 transparent to the relevant radiation wavelengths is arranged in the upper wall of the outer casing 3, allowing the thermographic camera 17 to measure the temperature of the powder layer.

A control unit 20 is arranged for controlling the additive manufacturing machine 1, and for estimating a powder layer thickness in the additive manufacturing machine when applying a first powder layer and selectively melting the first powder layer with an energy beam and thereafter measuring the temperature of the first powder layer at a plurality of time points. The control unit 20 is configured to provide a mathematical function giving a reference temperature as a function of time, which mathematical function is based on the measured temperatures of the first powder layer at the plurality of time points, and when applying a second powder layer on top of the first powder layer and measuring the temperature of the second powder layer at a predetermined time point, the control unit is configured to estimate the powder layer thickness of the second powder layer based on the measured temperature of the second powder layer and the reference temperature calculated by means of the mathematical function for the predetermined time point.

Preferably, the control unit 20 is configured to estimate the powder layer thickness of the second powder layer based on the reference temperature for a plurality of positions (with different x, y coordinates) in a horizontal plane (XY-plane in FIG. 3) and the measured temperature of the second powder layer in corresponding plurality of positions in the horizontal plane for the predetermined time point.

The control unit can be configured to provide such reference temperatures for the plurality of positions by using one the mathematical function for each position which mathematical functions are different from each other. For example, when using the thermographic camera 17, it is possible to use one mathematical function for each pixel of the camera.

The thermographic camera 17 and the control unit 20 are electronically connected for transmitting signals. The signals received from the thermographic camera are processed and analysed by the control unit 20. Thus, the control unit 20 suitably comprises a calculation unit and a unit for processing data from the thermographic camera 17. The control unit 20 may comprise one or more microprocessors and/or one or more memory devices or any other components for executing computer programs to perform the method, and the control unit is preferably provided with a computer program for performing all steps of any embodiment of the method described hereinabove. The control unit can be a separate component or be integrated in another controller.

The AM machine can then be controlled based on the estimated thickness of the second powder layer in order to correct for any deviations.

In the example embodiment illustrated in FIG. 3, the control unit 20 and the powder distributor device 6 are electrically connected to each other. The control unit is arranged to transmit signals to the powder distributor device 6 for controlling the powder distributor device, for example by adjusting the position and/or speed of the rake blade relative to the build table and the powder bed. Both the distance in a vertical direction (in parallel with the Z-axis) between the previous powder layer and the rake blade, and the speed of the rake blade in a horizontal direction (in parallel with the X-axis), will have an impact on the thickness of the powder layer being laid.

In the example embodiment illustrated in FIG. 3, the control unit 20 is also arranged for controlling the electron beam source 10 and thereby the electron beam 11 by transmitting signals to the coils 13, 14, 15 via the amplifiers 16. Hereby, the position, size and shape of the electron beam spot can be adjusted to the estimated powder layer thickness. In addition to control the equipment for focus, astigmatism and deflection, the control unit can be arranged for controlling other parameters of the energy beam source, such as the energy beam current, the energy beam power, the temperature of the cathode, etc. The control unit can be part of a controller used also for other functions of the AM machine, such as vertical movement of the build table, etc.

The control unit 20 can be combined with any of the features disclosed hereinabove, for example discussed with reference to the method and/or related to the AM machine. And as mentioned, various embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 4:
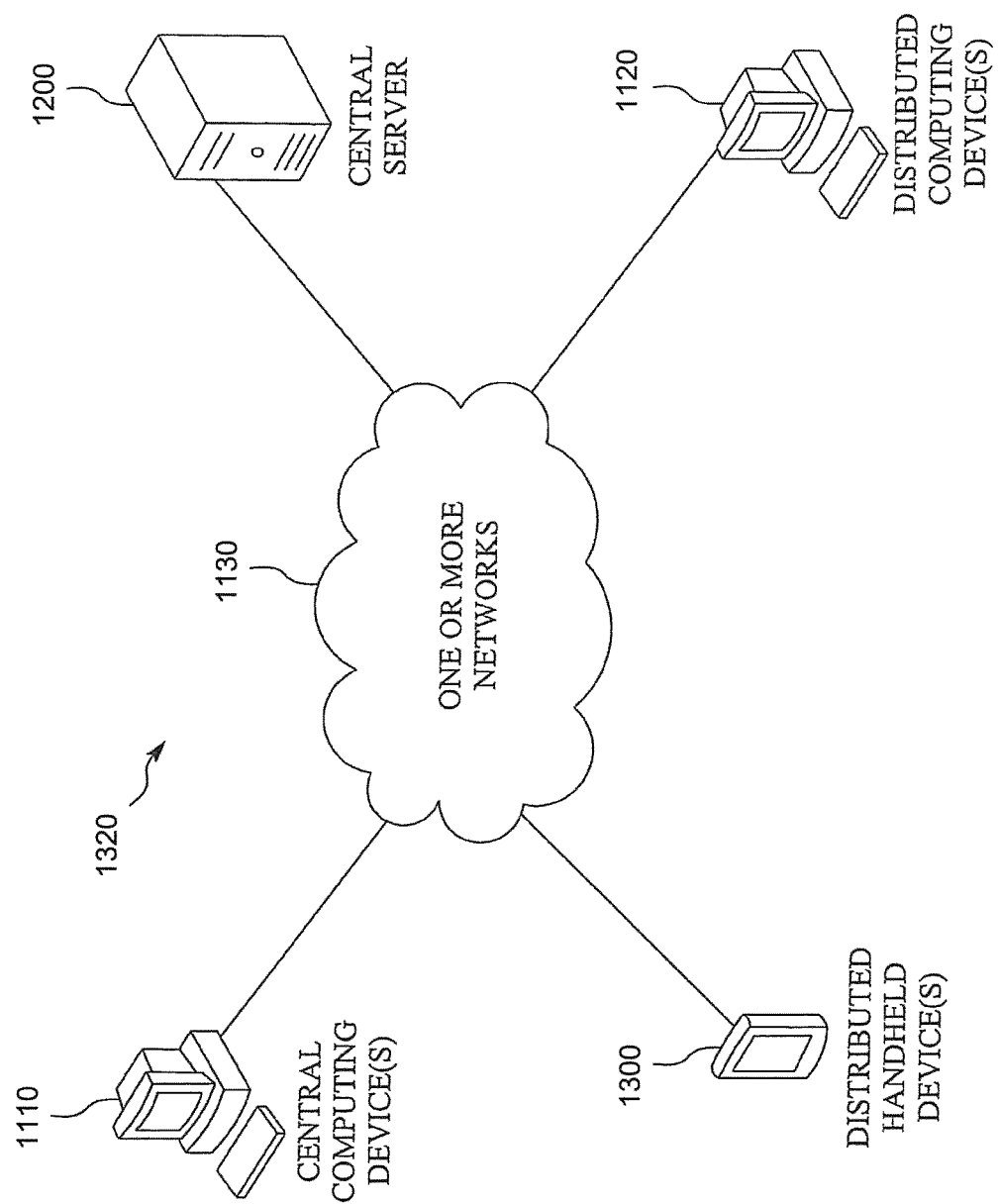
FIG. 4 is a block diagram of an exemplary system according to various embodiments.

FIG. 4 is a block diagram of an exemplary system 1320 that can be used in conjunction with various embodiments of the present invention. In at least the illustrated embodiment, the system 1320 may include one or more central computing devices 1110, one or more distributed computing devices 1120, and one or more distributed handheld or mobile devices 1300, all configured in communication with a central server 1200 (or control unit) via one or more networks 1130. While FIG. 4 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 1320 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-3100 are illustrated in FIG. 4 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 5:
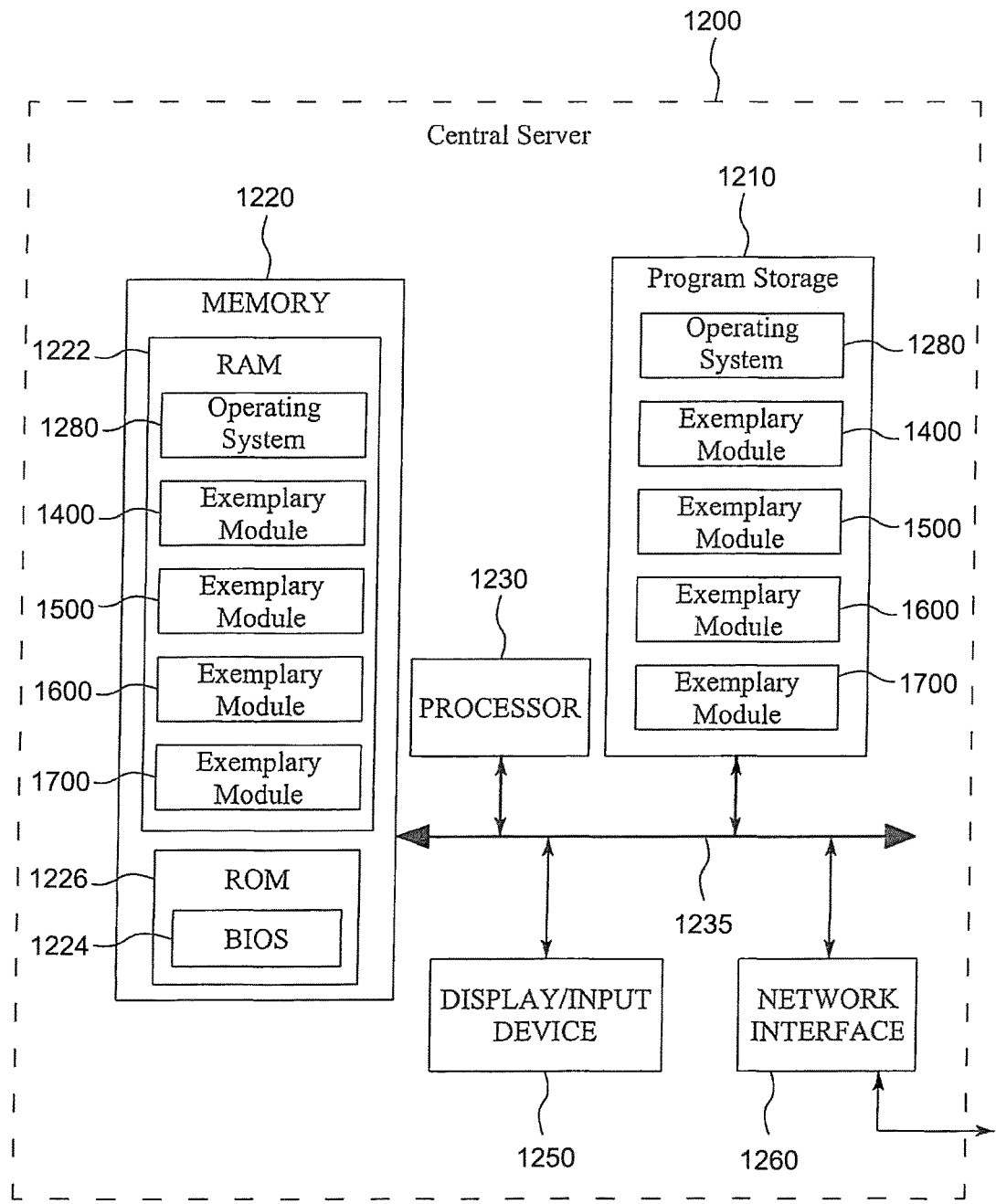
FIG. 5 is a schematic block diagram of an exemplary server according to various embodiments.

FIG. 5 is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which typically includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 1210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1320. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 6:
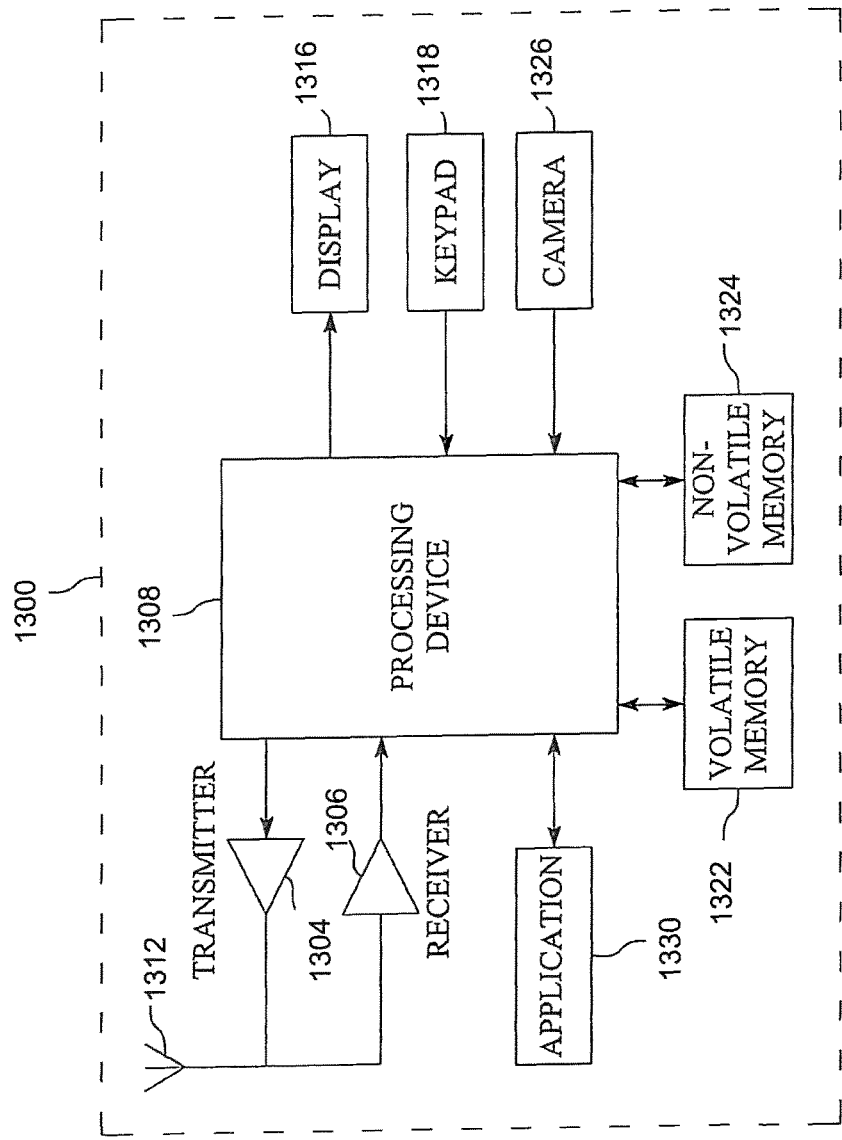
FIG. 6 is a schematic block diagram of an exemplary mobile device according to various embodiments.

FIG. 6 provides an illustrative schematic representative of a mobile device 1300 that can be used in conjunction with various embodiments of the present invention. Mobile devices 1300 can be operated by various parties. As shown in FIG. 6, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 1308). The user input interface can comprise any of a number of devices allowing the mobile device 300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1320 as a whole.

It is to be understood that the present invention is not limited to the embodiments described above and illustrated in the drawings; rather, the skilled person will recognize that many changes and modifications may be made within the scope of the appended claims.

The invention claimed is:

1. A method for estimating a powder layer thickness in an additive manufacturing machine when forming a three-dimensional article layer by layer by successive fusion of selected areas of powder layers, which selected areas correspond to successive layers of the three-dimensional article, the method comprising the steps of:

applying a first powder layer and selectively melting the first powder layer with an energy beam and thereafter measuring the temperature of the first powder layer at a plurality of time points, characterized by providing a mathematical function giving a reference temperature as a function of time, which mathematical function is based on the measured temperatures of the first powder layer at the plurality of time points;

applying a second powder layer on top of the first powder layer and measuring the temperature of the second powder layer at a predetermined time point; and estimating the powder layer thickness of the second powder layer based on the measured temperature of the second powder layer and the reference temperature calculated by means of the mathematical function, based on the measured temperature of the first powder layer at the plurality of time points, for the predetermined time point.

2. The method according to claim 1, characterized by providing the reference temperature as a theoretical temperature for the first powder layer without the second powder layer arranged on top of the first powder layer.

3. The method according to claim 1, characterized by providing the reference temperature as a temperature for the second powder layer, the reference temperature being a function of the thickness of the second powder layer arranged on top of the first powder layer.

4. The method according to claim 2, characterized by providing the reference temperature for a plurality of positions in a horizontal plane and measuring the temperature of the second powder layer in corresponding plurality of positions in the horizontal plane for the predetermined time point.

5. The method according to claim 4, characterized by providing the reference temperature for the plurality of positions by one the mathematical function for each position which mathematical functions are different from each other.

6. The method according to claim 4, characterized by dividing the first powder layer into different sub areas and providing the reference temperature for the plurality of positions within each sub area by one the mathematical function for each position which mathematical functions are the same within one and the same sub area and which mathematical functions are different from each other with respect to different sub areas.

7. The method according to claim 6, characterized by calculating an average reference temperature for each sub area based on the reference temperatures for the plurality of positions within each sub area.

8. The method according to claim 1, characterized by measuring the temperature of the second powder layer at a plurality of predetermined time points and estimating the powder layer thickness of the second powder layer based on the measured temperatures of the second powder layer and the reference temperatures calculated by the mathematical function for the plurality of predetermined time points.

9. The method according to claim 1, characterized by measuring the temperature of the second powder layer at the predetermined time point after raking of the second powder layer.

10. The method according to claim 1, characterized by measuring the temperature of the second powder layer at the predetermined time point after the temperature of the second powder layer has passed a local maximum.

11. The method according to claim 1, characterized by measuring the temperature of the second powder layer at the predetermined time point before starting to selectively melt the second powder layer by the energy beam.

12. The method according to claim 1, characterized by measuring the temperature of the second powder layer at the predetermined time point before starting any pre-heating of the second powder layer by the energy beam.

13. The method according to claim 1, characterized by measuring the temperature of the first powder layer at the plurality of time points in a position of the first powder layer which has been previously melted.

14. The method according to claim 1, characterized by measuring the temperature of the first powder layer at the plurality of time points by a thermographic camera directed to an upper surface of the first powder layer and/or measuring the temperature of the second powder layer at the predetermined time point by the thermographic camera directed to an upper surface of the second powder layer.

15. The method according to claim 1, characterized by sensing a position of a movable powder distributor device used for applying the second powder layer, and calculating the predetermined time point for measuring the temperature of the second powder layer based on the sensed powder distributor device position.

16. The method according to claim 15, characterized by calculating the predetermined time point for measuring the temperature of the second powder layer by adding a time period to a time point for which time point the powder distributor device position is known.

17. A control unit for controlling an additive manufacturing machine, for estimating a powder layer thickness in the additive manufacturing machine when applying a first powder layer and selectively melting the first powder layer with an energy beam and thereafter measuring the temperature of the first powder layer at a plurality of time points, characterized in that:

the control unit is configured to provide a mathematical function giving a reference temperature as a function of time, which mathematical function is based on the measured temperatures of the first powder layer at the plurality of time points; and when applying a second powder layer on top of the first powder layer and measuring the temperature of the second powder layer at a predetermined time point, the control unit is configured to estimate the powder layer thickness of the second powder layer based on the measured temperature of the second powder layer and the reference temperature calculated by means of the mathematical function, based on the measured temperatures of the first powder layer at the plurality of time points, for the predetermined time point.

18. A computer program product comprising at least one non-transitory computer-readable storage medium having computer-readable program code portions embodied therein, the computer-readable program code portions comprising one or more executable portions configured for:

applying a first powder layer and selectively melting the first powder layer with an energy beam, thereafter measuring the temperature of the first powder layer at a plurality of time points, calculating, via a mathematical function, a reference temperature as a function of time, which mathematical function is based on the measured temperatures of the first powder layer at the plurality of time points, applying a second powder layer on top of the first powder layer, measuring the temperature of the second powder layer at a predetermined time point, and estimating the powder layer thickness of the second powder layer based on the measured temperature of the second powder layer and the reference temperature calculated by means of the mathematical function, based on the measured temperature of the first powder layer at the plurality of time points, for the predetermined time point.

19. The computer program product according to claim 18, characterized by the executable portions being further configured for dividing the first powder layer into different sub areas and calculating the reference temperature for a plurality of positions within each sub area by one the mathematical function for each position which mathematical functions are the same within one and the same sub area and which mathematical functions are different from each other with respect to different sub areas.

20. The computer program product according to claim 18, characterized by the executable portions being further configured for calculating an average reference temperature for each sub area based on the reference temperatures for a plurality of positions within each sub area.

* * * * *